FIG. I

INVENTORS
E.C. BOPF &
A.L. HUBBARD
BY
W.A. Murray
ATTORNEY

INVENTORS
E.C. BOPF &
A.L. HUBBARD
BY W.A. Murray
ATTORNEY

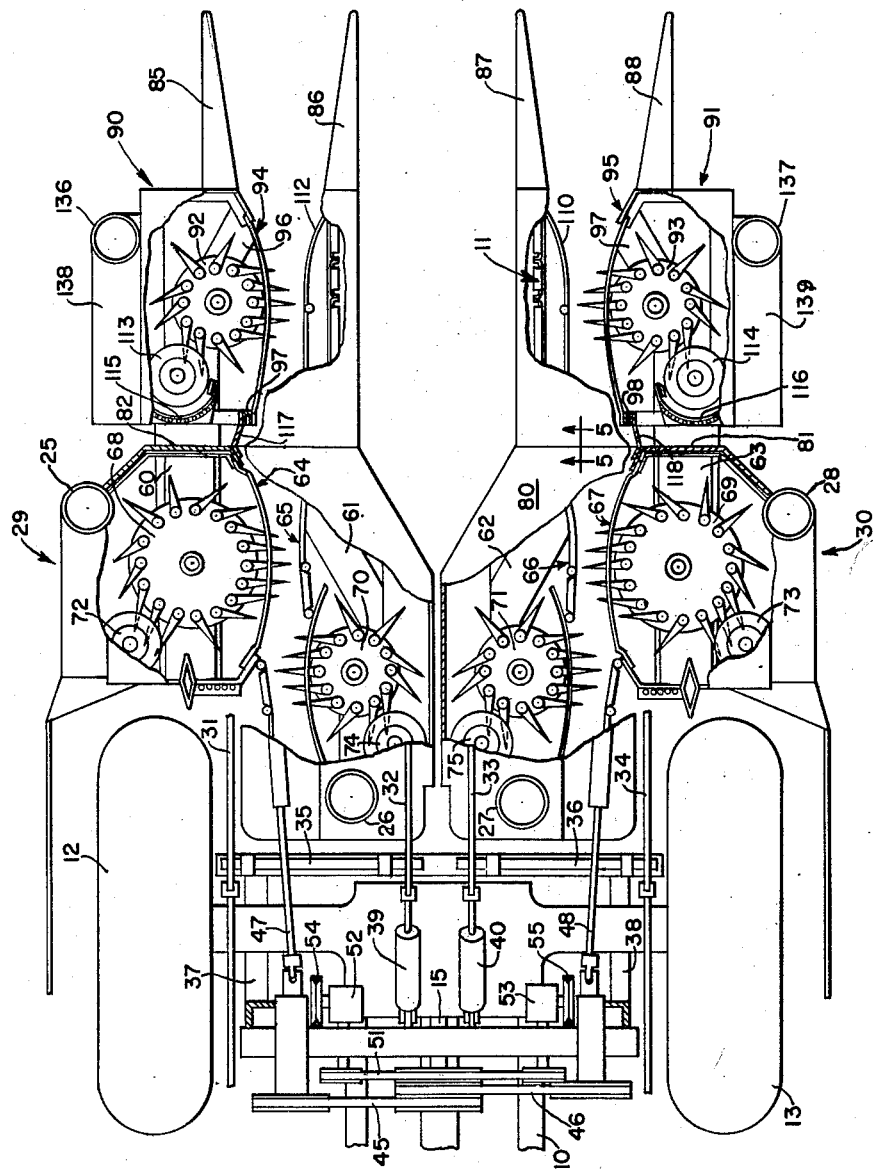

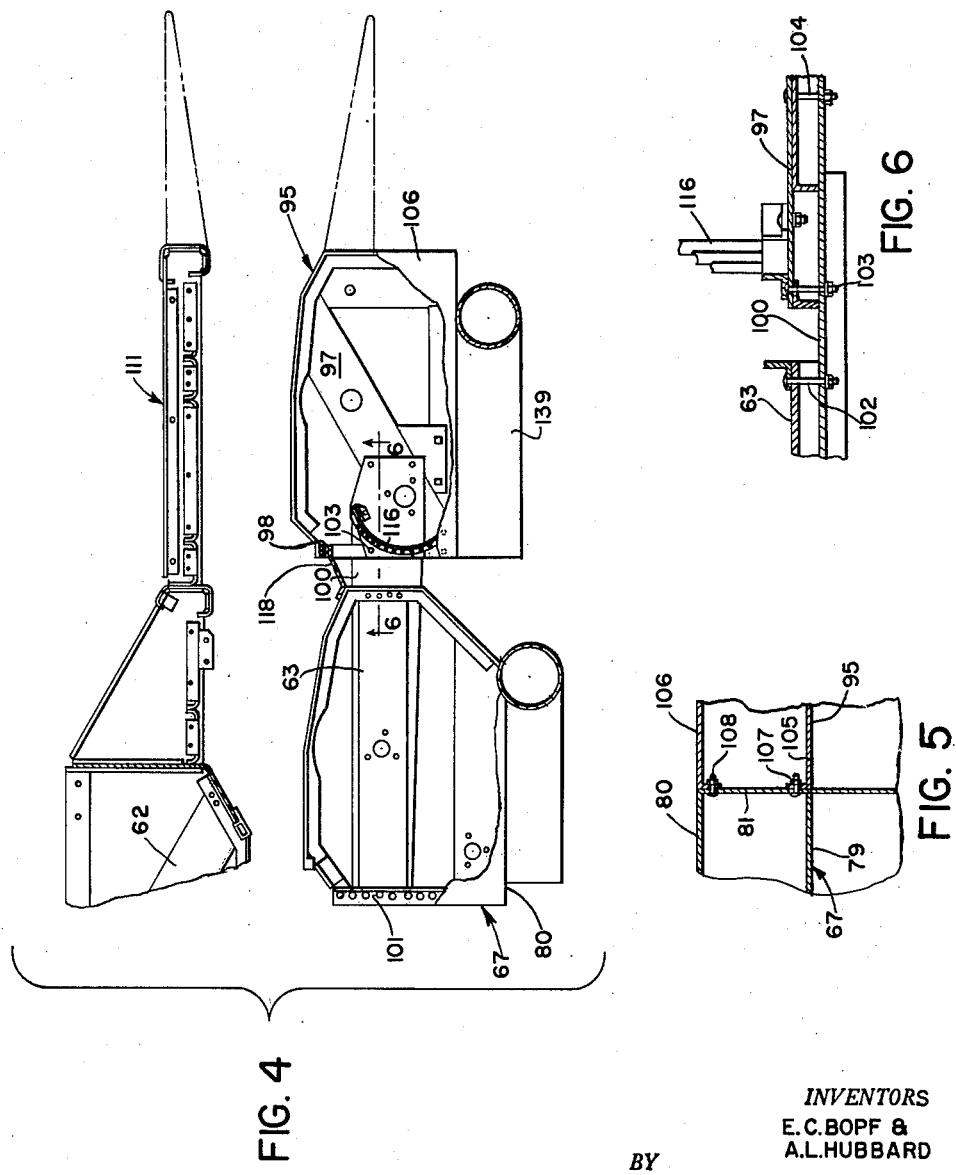

United States Patent Office
3,108,416
Patented Oct. 29, 1963

3,108,416
COTTON HARVESTER
Edward C. Bopf and Arthur L. Hubbard, Des Moines, Iowa, assignors to Deere & Company, Moline, Ill., a corporation of Delaware
Filed Apr. 10, 1961, Ser. No. 101,897
5 Claims. (Cl. 56—14)

This invention relates to a cotton harvester of the type utilizing vertically disposed spindle drums having laterally extending spindles which extend into a cotton plant and dislodges or detaches the cotton bolls from the plant. More particularly this invention relates to a cotton harvester in which two spindle drums are positioned on one side of the plant passage and one spindle drum is positioned on the opposite side of the plants.

Still more particularly this invention relates to an attachment for a conventional type cotton harvester having a pair of spindle drums positioned on opposite sides of a plant passage which operates to pick cotton from opposite sides of the row. The attachment is composed primarily of a third drum and a supporting structure therefor which is positioned forwardly of one of the conventional type picking drums and is offset to one side of the passage.

In the conventional type of cotton harvester there is normally provided a pair of picking drums on opposite sides of a plant passage formulated by the housing for the drums. In most instances the two drums are sufficient to harvest the crop of cotton. However, in certain locales throughout the country, the plants produce cotton in such abundance that the conventional type two drum picker is not sufficient or adequate to completely harvest the crop from the plants. It is therefore the primary object of the present invention to provide an attachment for the conventional type cotton harvester which features a third drum and supporting structure therefor which may be detachably mounted on the forward end of the conventional type harvester so as to increase the capacity of the harvester.

In providing a third picking drum as an attachment, it becomes necessary to increase the capacity of the suction conveying means which moves the harvested crop from the area of the picking drum. Conventionally there is provided a fan with a pair of outlets which draws the cotton from the area of the two drums. However, upon an attachment being added, it becomes necessary to provide additional suction means to move the harvested cotton from the third drum. Consequently it is a further object of the present invention to provide as a part of the attachment an additional suction means including a primary suction fan which moves the cotton harvested by the attachment drum.

In operating a conventional type two row cotton harvester, there is provided a pair of outboard spindle drums which contacts the pair of rows from their outer side, and a pair of inboard spindle drums which contacts the respective plants from the inner side. In providing a third drum, it is proposed and it is an object of the present invention to position the additional drums for each row on the outboard side of the plants. In this manner, there will be provided a walk-in area between the pair of third drum attachments in which an operator may move so as to work on the picking drums on the inboard or inner side of the cotton plants. Such a feature is a necessity since there is considerable maintenance required on a cotton harvester. By so providing the third drum, all of the picking drums and the surrounding area therefor may be approached for such maintenance.

Other objects and advantages of the present invention will become apparent to those skilled in the art as the nature of the invention is better understod from the following description and as shown in the accompanying drawings.

FIG. 3 is a plan view of the unit shown in FIG. 2 with portions broken away for purposes of showing internal mechanism.

FIG. 4 is a plan view of the floor or bottom framework of the right harvesting unit.

FIG. 5 is a sectional view taken substantially along the lines 5—5 of FIG. 3.

FIG. 6 is a sectional view taken substantially along the lines 6—6 of FIG. 4.

Figure 1:
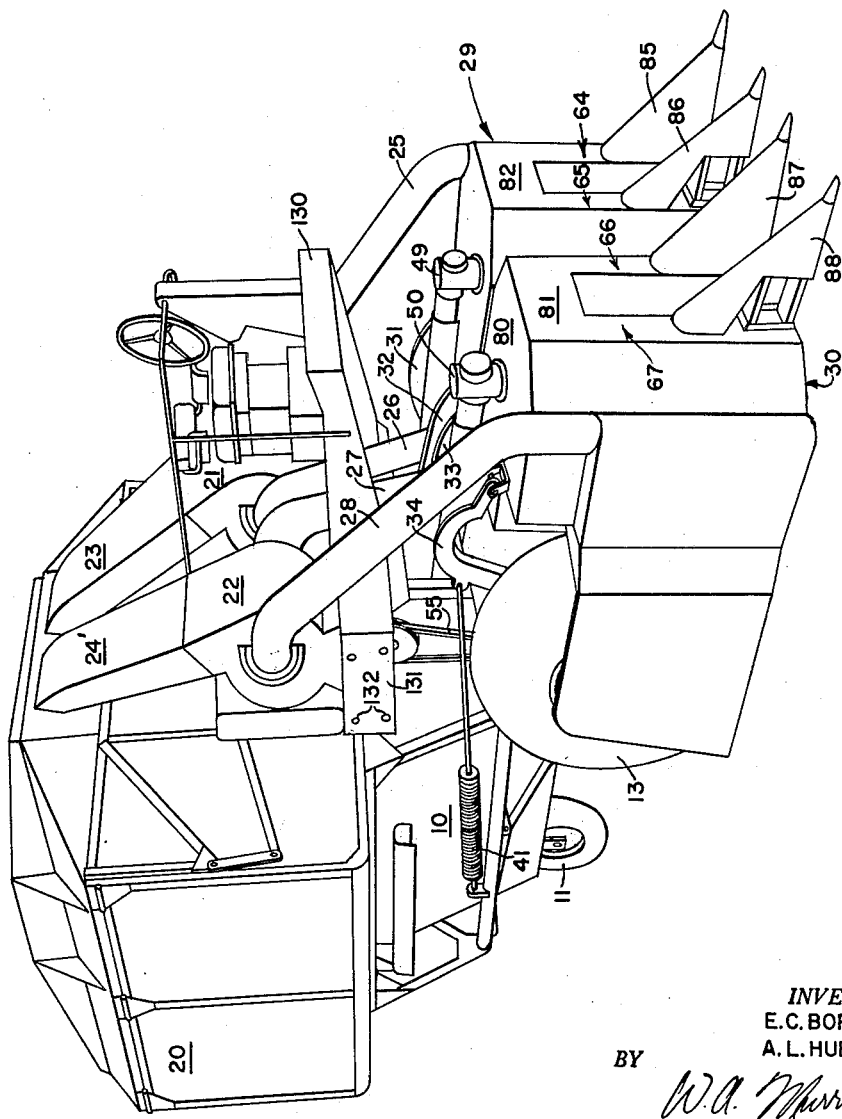
FIG. 1 is a side and front perspective view of a conventional type two row cotton harvester.
Figure 2:
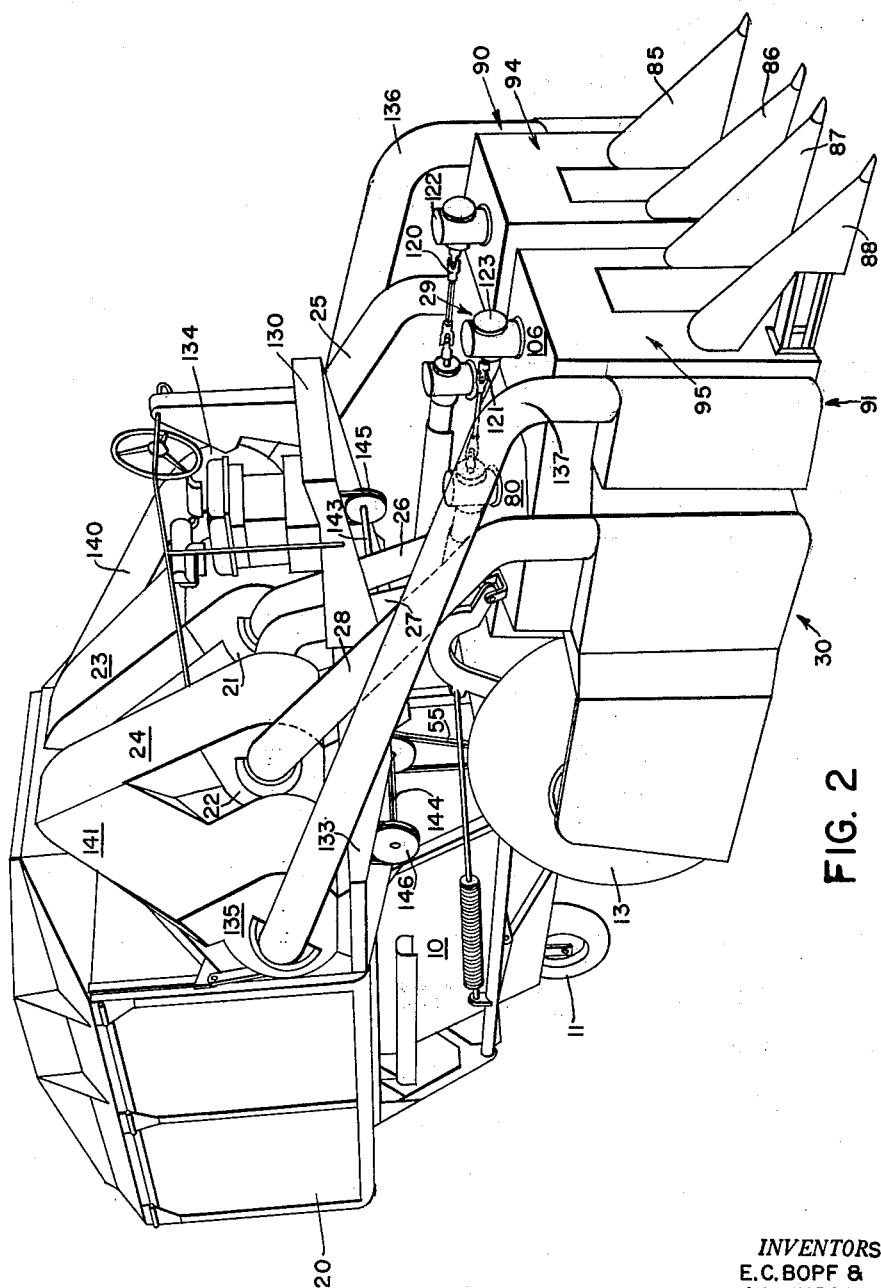
FIG. 2 is a view somewhat similar to FIG. 1 with the third drum attachments and their associated suction conveyed systems shown attached to the conventional two row picker.

Referring now to FIGS. 1 and 2, there is provided a main mobile structure featuring a main body 10, a rear steerable wheel 11 and a pair of forward main traction wheels 12, 13. The main mobile frame also includes a differential structure, indicated by its housing 14, positioned between the traction wheels 12, 13. Extending rearwardly from the differential body 14 is a power take-off shaft 15. In this respect it should be understood that the mobile frame is generally of conventional nature and it is here described only in general terms for purposes of orientation.

Supported on the main frame or body 10 is a cotton receptacle or basket 20 which receives the harvested cotton from the harvesters. In the conventional two row picker, there is provided forwardly of the basket a pair of blowers 21, 22 with blower ducts 23, 24 leading from the blowers to the forward side of the basket 20. Suction inlets 25, 26 and 27, 28 lead from harvester units 29, 30 respectively to the blowers 21, 22.

The harvesting units 29, 30 are similar in many respects to that shown and described in U.S. Patent 2,660,852 which issued to Mr. L. A. Paradise on December 1, 1953, and to the structure shown and described in U.S. Patent 2,904,948 which issued to Mr. A. L. Hubbard, September 22, 1959.

The main traction wheels 12, 13 are spaced transversely apart sufficiently that a pair of adjacent rows of cotton plants may pass just inboard of each of the respective wheels 12, 13. The harvesting units 29, 30 are disposed in side-by-side relation so that the adjacent rows are harvested. The row units 29, 30 are supported on the main frame 10 by rock arms 31, 32 and 33, 34 which in turn are mounted on transverse rockshafts 35, 36 respectively. The rockshafts are journaled on suitable supporting structure such as at 37, 38 which mounts the shafts on the main frame 10. The harvesting units 29, 30 are suspended by the rock arms 31—34 and are raised and lowered by hydraulic cylinders 39, 40 that extend between the main frame 10 and the inner rock arms 32, 33. Suitable spring-loaded shock-absorbing means, such as shown at 41, are connected to the outer rock arms 31, 34.

Drive means for operating the harvesting units 29, 30 are received basically from the rearwardly directed power take-off shaft 15 through means of a pair of transversely disposed belt drives 45, 46 which operate forwardly directed driveshaft means 47, 48 extending forwardly to bevel gear transmissions 49, 50. The latter drive the respective harvesting units 29, 30. The mounting mechanism as well as the drive mechanism is generally conventional and is similar in most details to the mounting and drive mechanism shown and described in the aforementioned Paradise patent. Consequently, such is here described only to the extent believed necessary for a full appreciation of the present invention.

A third belt drive 51 is provided on the power take-off shaft 15 and extends transversely to opposite sides thereof to bevel gear transmissions 52, 53 which in turn drive vertical belt drives 54, 55 extending upwardly to drive the respective blowers 21, 22.

The picking units 29, 30 are composed of a series of laterally disposed floor frames or subframes, 60, 61 and 62, 63, respectively. Supported on the subframes 60—63 are a series of upright casings shown in their entirety by the reference numerals 64, 65, and 66, 67 respectively, which are disposed on opposite sides of the respective rows of plants and form between them a pair of plant passages disposed fore and aft relative to the direction of travel. The outer casings 64, 67, are disposed generally in fore and aft alignment with the wheels 12, 13 and have in conventional manner high-capacity picking spindle drums 68, 69 respectively. The inner casings 65, 66 are disposed between the wheels 12, 13 closely adjacent the transverse axle and have contained therein low-capacity picking spindle drums 70, 71 respectively. The drums 68—71 are of conventional types and have a series of laterally disposed spindles which upon rotation of the respective drums pass into the plant passage for purposes of harvesting the cotton from the plants. Cooperating with the spindle drums 68, 69, 70, 71 are doffing drums 72, 73, 74 and 75 respectively which operate to remove the harvested cotton from the spindles and to discharge them in the area of the suction ducts 25—28 from where they are conveyed to the blowers 21, 22 and from there into the basket 20. The casings or housings 64—67 as well as the general location of the picking drums and doffing mechanism are similar in most respects to those shown and described in the aforementioned Hubbard patent. As is conventional, the casings 64, 65, 66 and 67 are closed at their upper ends by means of laterally disposed walls, one of which is shown at 79 (FIG. 5) for the right-hand harvesting unit. Spaced above the laterally disposed wall 79 and extending completely across the housings or casings 66, 67 is a second laterally disposed wall 80. The walls 79, 80 are suitably joined by side walls or casings which are in effect continuations of the outer walls of the casings 66, 67. Consequently the two casings or housings 66, 67 are joined at their upper end by an upper box-like structure which rigidly holds the two casings in fixed and rigid relation to one another. Extending across and defining the front of the two housings 66, 67 is an integral upright wall 81. A similar arrangement of wall structure with a front upright wall 82 is provided on the left-hand harvesting unit 29. Gathering points 85, 86 for the harvesting units 29 and 87, 88 for the harvesting unit 30 are provided to gather and move the plants into the plant passage between the respective casings or housings 64, 65 and 66, 67. The gathering points 85, 86, 87, 88 are removable from the front walls 81, 82 and, as will later become apparent, are adapted to be mounted on the attachment.

The attachment herein to be described may be used as an attachment or, should it be desired, it may be installed as an integral part of the original cotton harvester. Consequently it should be understood that the fact it is shown and described as an attachment is not meant in any manner to be a limitation in the present invention even though it is anticipated that its primary use will be as an attachment.

Provided forwardly of the harvesting units 29, 30 are third drum attachments, indicated in their entirety by the reference numerals 90, 91. The attachments 90, 91 are composed of low-capacity picking spindle drums 92, 93 which are positioned outboard of the plant passages formed between previously described spindle drums 68, 70 and 69, 71 respectively. The drums 92, 93 are disposed within upright casings or housings 94, 95 respectively which are supported on lower or laterally disposed frameworks or subframes 96, 97 respectively. Rear upright posts 98, 99 are provided on the subframes 94, 95 adjacent the plant passage. Referring to FIG. 4, the entire attachment housing 95 is supported on a fore-and-aft extending plate 100 which is connected to the front and rear ends of the fore-and-aft extending and laterally disposed subframe 63 of the picker housing 67 by means of bolts 101, and 102. The plate 100 extends forwardly of the picker housing 67 and underlies the subframe 97 and is bolted thereto by means of bolts 103, 104. Consequently, as may be seen, the entire forward housing unit 95 is supported by the picker housing 67 in cantilever fashion by the plate 100. Referring to FIG. 5, the housing 95 is provided with upper laterally disposed plates or panels 105, 106 which are in effect forward continuations of the top panels 79, 80 previously described relative to the rear housings 66, 67. The panels 105, 106 are bolted to the forward wall or panel 81 of the casing 79 by means of bolts 107, 108. Consequently the housing 95 is fixed to the housing at the lower end by means of the under plate 100 and at the upper end by bolts 107, 108. Positioned on the opposite side of the plant passage and the picking drum 93 is a pressure plate 110 which operates in conjunction with the drum 93 to maintain a degree of pressure on the plant so that the cotton bolls may be properly harvested by the spindles on the drum 93. The pressure plate 110 is fixed to underlying framework, indicated in FIG. 4 in its entirety by the reference numeral 111. The framework 111 is fixed to the forward edge of the framework on the inboard unit 66 and generally on the subframe 62. Thus the walls 105, 106 extend completely across the forward end of the housing 66, 67 and consequently the series of bolts 107, 108 also serve to support the pressure plate 110 as well as its respective subframe 111. Generally it should be recognized that the pressure plate 110 and its respective subframe has a relatively narrow transverse dimension and is offset toward the plant passage as compared to the rear inboard housing 66. As will become apparent by viewing FIG. 3, a similar pressure plate 112 is provided for the left picking attachment 90. Since the pressure plates 110, 112 and the associated housing surrounding the pressure plates are narrow in their transverse dimension there is provided between the two pressure plate structures a passage in which an operator may move to service or maintain the inboard picking mechanisms 70, 71 as well as the area adjacent the pressure plates 110, 112.

Positioned and mounted on the subframes 94, 95 so as to remove the picked cotton from the picking drums 92, 93 are a pair of doffing drums 113, 114. The doffing drums 113, 114 are positioned forwardly of arcuately disposed upright rod structures 115, 116 respectively. The rod structures 115, 116 define perforate walls through which trash may pass to impinge against the upright imperforate walls or panels 81, 82. Viewing FIGS. 3, 4 and 6, it becomes apparent that the rod structure 116 is supported on a laterally disposed plate carried by subframe 97. The rod structure 116 extends only partially across the rear end of the picker attachment 91 and is positioned a substantial distance forward of the front wall 81. Similarly the rod structure 115 is positioned a considerable distance forward of the front wall structure 82. Extending rearwardly from the posts 97, 98 upright panels 117, 118 having their rear terminal edges lying against the inner portions of upright walls 82, 81 respectively. In operation as the picking drums 92, 93 rotate, trash will be collected with the cotton as it is picked from the plant. The trash will have a tendency through centrifugal action to depart from the picking spindles prior to the time that the spindles contact their respective doffing drums 113, 114. As may be seen from viewing FIGS. 3 and 4, the housing structures 94, 95 are generally open at their rear end so as to permit trash to pass behind the grille structures 115, 116 and to impinge against the solid front walls 81, 118 and 82, 117 where it may either pass outwardly or onto the ground. In either case, the trash will be removed from the cotton harvesting area prior to the time that the cotton is removed from the spindles. Thus, trash is not accumulated or collected and passed into the suction conveying system nor is it passed back into the plant passage from the front units 90, 91.

The power for operating the forward attachments 90, 91 is received from the bevel gear transmisions 49, 50 and include a pair of forwardly directed drive shafts 120, 121, which are articulately connected at opposite ends to the gear transmissions 49, 50 and attachment gear transmissions 122, 123 which are positioned to operate the forward harvesting mechanisms in the attachment units 90, 91. As may be clearly seen from viewing FIG. 3, the attachment unit 91 is quite similar to the inboard picking unit consisting of the picking drum 70 and the doffer 74. It is contemplated from a practical standpoint to have interchangeable or to have similar units used in both locations. Similarly the harvesting mechanism in the attachment unit 90 is similar to the inboard harvesting mechanism consisting of the picking drum 71 and the associated doffing mechanism 75. It is also contemplated that these may be used interchangeably.

Consequently other details of the drive mechanism is believed not necessary for full disclosure of the present invention since the drive mechanism will be quite similar to that used on a conventional cotton harvester.

Referring again to FIGS. 1 and 2, it will be noted that in FIG. 1 the blowers 21, 22 are supported on a platform 130. As is conventional, the platform 130 is composed of a laterally disposed floor structure with depending sides which includes a vertically disposed end plate 131 on the right end and a similar plate on the left end which is not shown. The plate 130 as well as the plate not shown is provided with a series of openings 132 on which may be bolted, or otherwise fixed, a platform extension 133, shown in FIG. 2, as well as a similar platform 130. The platform extensions support additional blowers 134, 135 which have forwardly directed suction ducts 136, 137 extending to outer door structures 138, 139 of the forward attaching units 90, 91. It should be recognized that the attachment units 90, 91 will be the first units to contact the cotton bolls and consequently considerable of the bolls will be removed by the forward drums 92, 93. Also, the suction ducts 136, 137 are considerably long and the harvested cotton must be conveyed a considerable distance. For these reasons, the single ducts leading to the blowers 134, 135 are attached to the attachment units 90, 91 and the suction ducts 25, 26, 27, 28 remain in the positions relative to the harvesting units as existed without the attachment. The door structures 138, 139 terminate forwardly of the front walls 82, 91 so as to permit the trash passing through the rear of the housings 94, 95 to pass outwardly behind the grille structures 115, 116.

Side openings are provided in the side walls of the blower discharge ducts 23', 24' and discharge ducts 140, 141 are joined with the ducts 23', 24' adjacent their point of entry into the picker basket 20. The ducts 23', 24' are identical to the previous ducts 23, 24 with the exception of the side openings in their side walls that receive the ducts 140, 141 respectively. Since the entire additional blower system consisting of the blowers 134, 135 and their associated ducts 136, 137 and the discharge ducts 140, 141 are carried on the detachable platform extensions, it becomes apparent that they may be added or removed without difficulty. Similarly, since the entire forward attaching units 90, 91 are detachably mounted on the basic harvesting units by means of bolts 107, 108 and 101, 102, the entire attachment may be added or subtracted from the unit as desired. Jackshafts 143, 144 are added and are driven from the belt drives 54, 55. On the outer ends of the jackshafts are provided belt drives 145, 146 which drive the blowers 134, 135 respectively.

While only one form of the invention has been shown, it should be recognized that other forms and variations will occur to those skilled in the art. Therefore, it should be understood that it was not intended in setting forth the detailed description, to limit or narrow the invention beyond the broad concepts set forth in the appended claims.

What is claimed is:

1. An attachment for a cotton harvester including a main mobile frame, and a pair of harvesting units mounted on and disposed forwardly thereof for harvesting a pair of rows of cotton plants as the harvester advances over the field, each of the harvesting units including a pair of upright spindle casings spaced apart to define a fore-and-aft extending plant passage and supported on the frame inboard and outboard of the respective passage, and harvesting mechanisms supported in the outboard and inboard casings, said attachment comprising: a pair of attachment casings; means detachably mounting each of the attachment casings to a respective outboard casing of the harvesting units to extend forwardly of the outboard casings and outboard of the respective passages; harvesting mechanism supported within said attachment casings effecting harvesting of the plants from the outboard sides of the respective passages; conveying means effecting discharge of the harvested cotton from the casings; a pair of upright fore-and-aft extending pressure plate structures disposed on the inboard sides of the respective passages opposite to the attachment casings; and supporting means detachably connecting the pressure plate structures to the inboard casings, said pressure plate structures and their respective supporting means being relatively narrow in transverse dimension and spaced apart transversely to define a forward access opening therebetween to the inboard casings.

2. The invention defined in claim 1 in which the conveying means is a suction type conveyor with suction ducts leading from the attachment casing and including blower devices for transferring cotton from the attachment casing; and means detachably connecting said conveyor to the main frame.

3. An attachment for a cotton harvester including a main mobile frame, and a harvesting unit mounted on and disposed forwardly thereof for harvesting a row of cotton plants as the harvester advances over the field, the harvesting unit including a pair of casings spaced apart to define a fore-and-aft extending plant passage and supported on the frame on opposite sides of the respective passage, and harvesting mechanisms supported in the casings, said attachment comprising: an attachment casing: means detachably mounting the attachment casing to one of the pairs of casings of the harvesting unit and to extend forwardly thereof and to one side of the passage; and harvesting mechanism supported within said attachment casing effecting harvesting of the plants from the latter side of the respective passage, the casing of said pair of casings to which the attachment casing is mounted including a forward upright imperforate panel, said attachment casing including a rear upright imperforate wall disposed spacedly forwardly of the imperforate panel whereby trash from the harvesting mechanism contained within the attachment casing may pass through the perforate wall and into the aforesaid space.

4. The invention defined in claim 3 further characterized by an upright fore-and-aft extending pressure plate being disposed adjacent to the attachment casing and on the opposite side of the passage; and means mounting the pressure plate on and to extend forwardly of the other of said pair of casings.

5. The invention defined in claim 4 in which the outboard casings are transversely spaced apart and are forwardly of the inboard casings to define a walk-in area accessible from the front between the outboard casings.

References Cited in the file of this patent

UNITED STATES PATENTS

| | | |
|---|---|---|
| 2,649,677 | Paradise | Aug. 25, 1953 |
| 2,830,427 | Odom | Apr. 15, 1958 |
| 2,904,948 | Hubbard | Sept. 22, 1959 |